(12) United States Patent
Pederson

(10) Patent No.: US 6,637,124 B2
(45) Date of Patent: Oct. 28, 2003

(54) ADHESIVE MEASURING TAPE

(75) Inventor: Jeffrey C. Pederson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 39 days.

(21) Appl. No.: 09/761,081

(22) Filed: Jan. 16, 2001

(65) Prior Publication Data

US 2001/0003872 A1 Jun. 21, 2001

Related U.S. Application Data

(63) Continuation-in-part of application No. 09/295,033, filed on Apr. 20, 1999, now abandoned.

(51) Int. Cl.[7] .................................................. G01B 3/10
(52) U.S. Cl. ........................................... 33/758; 33/494
(58) Field of Search ........................ 33/758, 494, 759, 33/562

(56) References Cited

U.S. PATENT DOCUMENTS

| | | | |
|---|---|---|---|
| 2,177,627 A | 10/1939 | Drew | |
| 2,187,087 A | 1/1940 | Leary | |
| 2,507,684 A | 5/1950 | Smith | |
| 2,742,705 A | 4/1956 | Gelardi | |
| 2,792,110 A | 5/1957 | Wanish | |
| 2,932,897 A | 4/1960 | Huber | |
| 3,691,140 A | 9/1972 | Silver | |
| 3,797,120 A | 3/1974 | Byne | |
| 3,922,464 A | 11/1975 | Silver et al. | 428/355 |
| 3,936,944 A | 2/1976 | Byne | |
| 3,957,724 A | 5/1976 | Schurb et al. | |
| 3,997,702 A | 12/1976 | Schurb et al. | 428/352 |
| 4,149,320 A | 4/1979 | Troyer et al. | |
| 4,313,988 A | 2/1982 | Koshar et al. | 428/40 |
| 4,351,113 A | 9/1982 | Eggertsen et al. | |
| 4,567,073 A | 1/1986 | Larson et al. | 428/40 |
| 4,587,156 A | 5/1986 | Wu | 428/207 |
| 4,605,592 A | 8/1986 | Paquette et al. | 428/334 |
| 4,614,667 A | 9/1986 | Larson et al. | |
| 4,708,755 A | 11/1987 | Lambelet | |
| 4,825,763 A | 5/1989 | Truskolaski et al. | |
| 4,845,858 A | 7/1989 | Thomas | 33/759 |
| 4,873,140 A | 10/1989 | McIntyre | 428/343 |
| 4,965,943 A | * 10/1990 | Adams | 33/758 |
| 5,012,590 A | 5/1991 | Wagner et al. | 33/759 |
| 5,045,386 A | 9/1991 | Stan et al. | 428/262 |
| 5,141,790 A | 8/1992 | Calhoun et al. | 428/40 |

(List continued on next page.)

FOREIGN PATENT DOCUMENTS

| | | |
|---|---|---|
| DE | 1769600 | 7/1958 |
| DE | 19830676 | 1/2000 |
| DE | 19836501 | 2/2000 |
| DE | 19952731 | 6/2000 |
| EP | 0 570 515 B1 | 6/1996 |
| EP | 1069395 | 1/2001 |
| GB | 1 226 055 | 1/1969 |
| WO | WO 95/20632 | 8/1995 |
| WO | WO 98/29516 | 7/1998 |

*Primary Examiner*—G. Bradley Bennett
(74) *Attorney, Agent, or Firm*—Dale A. Bjorkman; George W. Jonas (57) ABSTRACT

An adhesive backed measuring tape is disclosed that can provide customized, printed measurement scales on a single flexible backing that has a positionable or repositionable adhesive for contact with flat surfaces, single curved surfaces, or compound curved surfaces. In a preferred embodiment, the measuring tape has multiple scales printed thereon. The combination of linear sections and transverse axes defined by intervals can permit a variety of repeating scales on a single tape, minimizing waste of tape unrolled from a dispenser.

10 Claims, 1 Drawing Sheet

U.S. PATENT DOCUMENTS

| | | |
|---|---|---|
| 5,194,299 A | 3/1993 | Fry |
| 5,202,190 A | 4/1993 | Kantner et al. ............. 428/447 |
| 5,229,207 A | 7/1993 | Paquette et al. ............ 428/355 |
| 5,290,615 A | 3/1994 | Tushaus et al. ............... 428/40 |
| 5,296,277 A | 3/1994 | Wilson et al. ................ 428/40 |
| 5,627,763 A | 5/1997 | Carlson |
| 5,666,737 A | 9/1997 | Ryan, III ..................... 33/562 |
| 5,747,148 A | 5/1998 | Warner et al. .............. 428/212 |
| 5,950,321 A | 9/1999 | Peña et al. .................... 33/758 |

\* cited by examiner

ADHESIVE MEASURING TAPE

This is a continuation-in-part of application Ser. No. 09/295,033 filed Apr. 20, 1999 now abn.

FIELD OF THE INVENTION

This invention relates to an adhesive-backed measuring tape, in one embodiment having multiple scales thereon.

BACKGROUND OF THE INVENTION

The variety of industries and crafts require accurate measurement of flat surfaces, simple curved surfaces, or compound curved surfaces. In the construction industry, retractable metal tape measures are common because of the reuse and adjustability of the tape measures. These tape measures do not have to be associated in direct contact with a substrate over the course of measurement in order to be useful.

The art has developed a variety of measuring tapes which require periodic or continuous contact with the substrate being measured in order to be useful. To distinguish from "tape measures", i.e., the mechanical, retractable, metallic variety, these "measuring tapes" are typically polymeric, paper or other flexible substrate having an adhesive on the major surface opposing the measuring scale, in order for that adhesive to contract the substrate either periodically or continuously over the course of measurement. Representative examples of such measuring tapes are disclosed in the U.S. Pat. No. 4,149,320 (Troyer et al.); U.S. Pat. No. 5,012,590 (Wagner et al.); and U.S. Pat. No. 4,845,858 (Thomas).

Each of the measuring tapes disclosed in the above-identified patents share some common features. All of the measuring tapes which have adhesive-backed surface for contacting the substrate periodically or continuously. All are directed for use in association with the building construction industry, and particularly that industry which includes concerns framing of wooden structures which have lumber studs at critical locations, e.g., 16 inch separation, 24 inch separation, and/or 48 inch separation.

The measuring tapes of the above-identified patents differ in the features which such inventors thought valuable for the building construction industry. For example, Troyer et al. emphasizes a code for identification of specific distances superimposed on a single scale measuring tape, either an English scale, a metric scale, or both. By contrast, the stud locating tape of Thomas is based on different center stud distances and colored in a code which relates to the different stud distances. This stud locating tape does not otherwise include numerical scales nor usefulness other than in the building construction trade based on specific distances between building structural components.

The disposable layout tape of Wagner et al. discloses a multitude of coded indications for use in positioning building materials, wherein the tape is intended to be left in place within the building upon completion. Again, a code is employed to indicate specific distances, but a numerical scale was deemed not necessary.

Each of the measuring tapes of the patents disclosed above have deficiencies which limit their versatility to use in the building trades. Moreover, none of the three measuring tapes disclosed in the these patents are concerned with how much a measuring tape one must use for smaller dimensioned constructions because all three are concerned with building materials locations which inevitably require many inches or centimeters of measuring tape for each usage. Nor are they concerned about adhesive qualities or characteristics of removability of the measuring tape from a surface after usage.

SUMMARY OF THE INVENTION

The art needs an adhesive backed measuring tape that is removable from finished surfaces without harm to the finished surface.

The art also needs an adhesive backed measuring tape that is positionable or repositionable to permit adjustment of the measurement position prior to taking the actual measurement.

As used herein, "positionable" means an adhesive or pressure sensitive adhesive surface can be placed against a substrate surface and easily slid over the surface into proper position without preadhering to the substrate; pressure is generally required to adhere the adhesive article to the substrate.

As used herein, "repositionable" means an adhesive or pressure sensitive adhesive surface can be applied and adhered to a substrate and then removed (generally within 24 hours) and reapplied without distorting, defacing, or destroying the backing, adhesive, or substrate; repositionable adhesives need not be positionable or vice versa.

The art also needs an adhesive backed measuring tape which minimizes waste and maximizes the applicable starting point for measurement.

Further, the art needs an adhesive backed measuring tape which provides both numerical and color for multiple measurement usage within the same length of measuring tape.

One aspect of the present invention is an adhesive backed measuring tape, comprising (a) a flexible backing having two major surfaces, wherein one major surface has a measurement layer printed or contacted thereon and (b) a positionable or repositionable adhesive layer adhered to the other major surface of the flexible backing or to the measurement layer.

Another aspect of the invention is a method of using an adhesive backed measuring tape identified above, comprising the steps of (a) dispensing the measuring tape from a roll; (b) applying the measuring tape to a substrate; and (c) removing the measuring tape from the substrate.

A third aspect of the invention is an adhesive backed measuring tape, comprising (a) a backing having two major surfaces, wherein one major surface has a measurement layer printed or contacted thereon, wherein the measurement layer has a multiple of linear axes and a multiple of transverse axes, wherein each linear axis represents a linear segment of the measuring tape which is a function of the number transverse axes, and (b) an adhesive layer adhered to the other major surface of the backing or to the measurement layer.

A feature of the invention is the use of commercially useful positionable or repositionable adhesives on flexible substrates to permit adjustment to measurements or repeatable measurements without harm to the underlying substrate.

Another feature of the invention, in a preferred embodiment, is the use of linear axes along the same measuring tape to provide differing information.

Another feature of the invention, in a preferred embodiment, is the use of a multiple numerical scales and colored indications which can be customized for use in particular industries or crafts based on key measurements that are common to that industry or craft.

An advantage of the present invention is the use of positionable or repositionable adhesives on flexible substrates to minimize harm to a sensitive finished substrate, such as a silk garment being measured for a person.

Another advantage of the present invention, in a preferred embodiment, is a multi-scale measuring tape such that waste of a disposable measuring tape is minimized because the starting point for use of the measuring tape can exist at any linear axis employed along the measuring tape.

Another advantage of the invention is the ability to use convenient printing techniques during manufacture of the measuring tape to provide customized measuring tapes for particular businesses within given industries or crafts to publicize and promote that business within the industry or craft.

Other features in advantage will become apparent in the discussion of embodiments of the invention in view of the following drawings.

EMBODIMENTS OF THE INVENTION

For purposes of the present invention, an adhesive is repositionable if it passes the following test:

Tape samples are applied to a white bond 20 pound xerographic quality paper. For testing the paper was applied to a metal surface with double-sided adhesive. Tape samples are applied to the paper substrate using a 5 lb, 3.25 inch diameter, rubber coated roller, rolled over the tape once. The tape is then removed using a 90 degree pull at a rate of 90 inches per minute. The test is pass/fail based on damage to the paper substrate or tape substrate. Damage is defined by the inability to reapply the tape to the substrate, that is, paper fiber left on the tape prevents it from being re-applied. If able to apply a second time, second peel of re-applied tape gives 50% or less of initial peel force. If tape backing is torn, ripped etc. the test is also considered a failure.

Measuring tapes of the present invention are particularly advantageous, because they allow for easy, hands-free measuring on any surface condition by a single person. Because the tape will conform to surfaces of any shape, including curved surfaces, accurate measurement may be accomplished with great ease.

Due to the ease of use of the present invention, measuring tapes as described herein find beneficial use for home consumer in such diverse projects as hanging pictures, home remodeling projects, craft projects, hobby projects (e.g. model building), and school/science projects. Additionally, the present measuring tape is desirable for professional use as well, such as as a layout tool for picture framers, sign makers, woodworkers, graphic designers and the like. Further, the present measuring tape finds use as a measuring tool for drafting, architectural drawings and maps. Additional uses comprise as a measurement device that may be applied for selectively long term uses such as on table-tops, workbenchs, notebooks and equipment scales.

The present masking tape further provides an inexpensive courtesy item for use in stores, such as for fabric, clothing, hardware, furniture, and appliance stores. Additionally, the present masking tape may be included in do-it-yourself kits, e.g., closet storage kits.

Because the measuring tapes of the present invention are repositionable, they leave no marks on finished surfaces and will not damage sensitive surfaces. Additionally, repositionable measuring tapes of the present invention are re-usable, thereby enhancing the ease of use of the present product by allowing replacement in the event of error in placement in the first instance. Reusability also enhances the economy of the present invention.

Measuring Tape Construction

Figure 1:
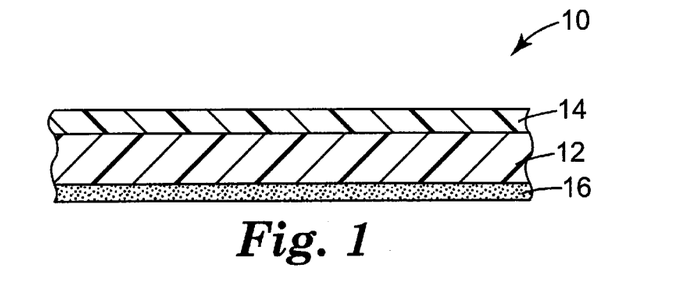
FIG. 1 is a cross-sectional view of one measuring tape of the present invention having an adhesive backing on a major surface opposite the major surface of the measuring scale.
Figure 2:
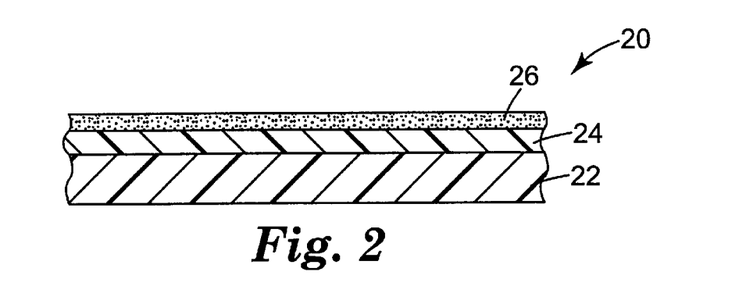
FIG. 2 is another embodiment of the present invention where adhesive is placed in contact with the scale to permit adhesion of the measuring tape on a transparent or translucent surface for measuring on the opposing side of that transparent or translucent surface.

FIG.1 and FIG.2 are alternate embodiments of a measuring tape of the present invention distinguished by the location of the functional layers of the measuring tape. Tape 10 in FIG.1 has a polymeric tape backing 12 having two major opposing surfaces, one of which has a measurement scale layer 14 printed or contacting banking 12 and the other having a layer 16 of pressure sensitive adhesive. Depending on the composition and properties of the measurement layer 14, adhesive layer 16 may need an optional release liner (not shown) in order to protect the adhesive prior to use and especially when tape is rolled upon itself Preferably, printed layer 14 has sufficient properties to permit release of adhesive layer 16 if tape 10 is stored in a roiled fashion, more preferably in a dispenser suitable for conveniently unrolling tape 10 along the substrate to be measured.

FIG. 2 is another embodiment of the present invention where tape 20 is composed of a backing 22 having two opposing major surfaces, wherein one of the major opposing surfaces has both a layer of measurement scale 24 and, on top of layer 24, a layer 26 of pressure sensitive adhesive. Tape 20 is particularly suitable for measurement of translucent or transparent materials where it is desired to have the measurement device on the opposite side from the location where measurement is desired. For example, in the manufacture of backlit signage, the assembly of colored pieces of translucent films on to a transparent or translucent surface may not permit the measuring tape to be adhered at the same location as the placement of the pieces of colored film. Use of a tape 20, conveniently called a "second surface" measuring tape permits measurement to be employed without interruption of the assembly of the backlit signage phase.

Figure 4:
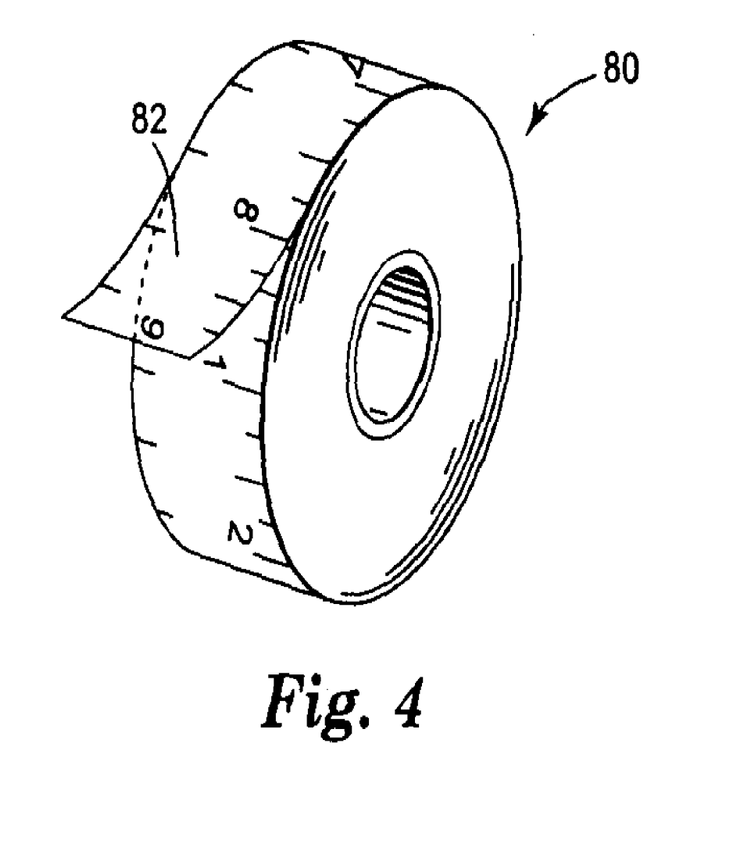
FIG. 4 is another embodiment of the present invention where an adhesive backed measuring tape is in a roll form.

FIG. 4 illustrates an embodiment of the present invention wherein tape 80 is wound directly upon itself in a roll form, and one major surface 82 has a measurement layer printed or contacted thereon.

For either embodiment seen in FIGS. 1 and 2, a possible additional feature is a series of perforations to aid in removal of a specific length of tape, e.g., perforations at 36" intervals in a manner to simulate a conventional English Scale Yard Stick.

Tape Backing

Backing 12 or 22 as seen in FIG. 1 or FIG. 2 can be any material having a relatively high tensile modulus (Young's modulus or flexural modulus) and relative insensitivity to temperature or humidity conditions and a relatively dimensionally stable structure. Nonlimiting examples of tape backing can include those materials which are, in any combination:

transparent, translucent, or opaque;

singularly colored, multiply colored, or white or black;

glossy, matte, metallic, reflective, retroreflective, or luminescent in appearance; and susceptible to printing, embossing, or other means of delivery of the measurement scales to layers 14 or 24.

Additionally, the surface (after printing of initial information) could be receptive to pen and pencil markings as desired by the user of the tape 10 or 20.

The tensile modulus of the backing 12 or 22 can typically range from about $1.0 \times 10^3$ lbs./in$^2$ to about $5.0 \times 10^7$ lbs./in$^2$ and preferably from $6.0 \times 10^4$ lbs./in$^2$ to $1.0 \times 10^6$ lbs./in$^2$.

Backing 12 or 22 preferably is a polyester having a thickness of from about 0.05 millimeters (2 mil) to about 0.10 millimeters (4 mil).

The backing should withstand temperatures ranging from about −45° C./to about 65° C., and preferably from about −17° C. to about 52° C.

The tape should be relatively insensitive to humidity ranging from about 0% R.H. to about 100% R.H.

Dimensional stability for backing 12 to 22 (described in terms of % change in sheet dimension) should range from about 0% to about 0.15% and preferably from about 0% to about 0.1%.

Nonlimiting examples of materials from which backing 12 and 22 can be constructed include polymers having the physical properties described above which are exemplified by polyesters (PET), high density polyethylene (HDPE), polyvinylidene fluoride, polyvinyl chloride, nylon, and some sturdy paper products. Such backings may be integrally dimensionally stable (with or without tensile orientation) or can include reinforcements such as nylon filaments to achieve dimensional stability.

Measurement Layer

Measurement layer 14 or 24 in FIG. 1 or 2 is a functional means of printing or otherwise delivering a measurement scale to such layers 14 and 24. If a composition of backing 12 or 22 is unsuitable for a particular method of creating the measurement scales on layers 14 and 24, then such layers 14 and 24 need to have coating or other surface treatments to enable accurate printing of a measurement scale on such layer 14 and 24. For example, in case of a backing composed of paper, a surface treatment may not be needed.

Nonlimiting examples of surface treatments for layers 14 and 24 include corona treatment, coatings (such as disclosed in U.S. Pat. Nos. 5,747,148 (Warner); and the like.

Nonlimiting examples of method of creating multiple scales on layers 14 and 24 include electrostatic printing, inkjet printing, thermo transfers, offset, flexographic printing, and the like. Of these methods, flexographic printing is presently preferred.

Particularly preferred for the creation of layers 14 and 24 are 4-color printing systems using the subtractive colors of cyan, magenta, yellow, and black ("CMYK" colors) to permit one skilled in the art of printing to create as many as 256 different colors or more according to the industry requirements or preferences.

Colorant used for creating layers 14 and 24 can range from pigmented particles such as included in inkjet inks, electrostatic toners used in electrographic printing dye based inks, offset web printing inks, and the like.

Surface embossing techniques can also be employed to mark physically the surface of the backing in order to provide a tactile differentiation for measurement use.

One factor for consideration by those skilled in the art is the size of the printing job for a particular tape 10 or 20 and the ability to customize such tapes depending on use of printing software such as GraphicMaker™ software commercially available from Minnesota Mining and Manufacturing Company through its Commercial Graphics Division. Large format printers can print a multitude of different types of measurement scales on tapes 10 or 20 with suitable cutting or slitting of such sheets into multiple, narrower tapes, rolled or unrolled.

Adhesives

Pressure sensitive adhesive layer 16 or 26 can be any pressure sensitive adhesive such as those known to those skilled in the art and disclosed in the *Handbook of Pressure Sensitive Adhesives, Second Edition*, Satas, Ed., (Van Nostrand, 1989), the disclosure which is incorporated by reference herein. Of the various pressure sensitive adhesives tapes so disclosed, acrylic pressure sensitive adhesive tapes are preferred, such as those commercially available from Minnesota Mining and Manufacturing Company of St. Paul, Minn. from a variety of its operating divisions and generally described in U.S. Pat. Nos. 3,922,464; 3,691,140; 5,141,790; 5,194,299; 4,605,592; 5,045,386; 5,296,277; and 5,229,207 and EPO Patent Publication EP 0 570 515 B1 (Steelman et al.); the disclosures of which are incorporated by reference herein. Another suitable adhesive is disclosed in PCT Patent Publication WO98/29516 and its related copending, coassigned, U.S. patent application Ser. No. 08/775,844 (Sher et al.), the disclosures of which are incorporated by reference.

As described in these documents, both positionability and repositionability of measuring tapes of the present invention are desirable because of the construction of the adhesive layers physically and compositionally.

For example, positionable adhesives are disclosed in EPO Patent Publication EP 0 570 515 that have high shear strength. More particularly, the aqueous adhesive composition is capable of displaying positionability; when applied as a layer to a substrate; while maintaining elevated shear strength and peel adhesion. The composition comprises an aqueous blend of: (a) an aqueous suspension of hollow; polymeric; infusible; inherently tacky elastomeric microspheres; wherein the microspheres are comprised of at least 85 parts by weight of at least one alkyl acrylate or methacrylate ester and up to 15 parts by weight of at least one polar monomer; and wherein a majority of the microspheres have a central cavity that is at least 10% of the diameter of the microspheres; and (b) an aqueous film-forming pressure sensitive adhesive latex comprising at least one long chain alkyl acrylate having from 4 to 12 carbon atoms; wherein the weight ratio of the microspheres to the latex; on a solids basis; is from 12 to 1 to 39 to 1. Use of this adhesive is preferred because one can position and reposition a measuring tape backed with this adhesive with minimal harm to the substrate being measured.

Another desirable adhesive is disclosed in U.S. Pat. No. 5,141,790 (Calhoun et al.). This pressure-sensitive adhesive tape or sheet is reliably repositionable by having a plurality of spaced clumps of particles uniformly distributed over at least one surface of the pressure-sensitive adhesive layer with the tips of the clumps of particles being substantially free from adhesive, which particles are smaller than the thickness of the pressure-sensitive adhesive layer. Preferred particles are glass beads which may be from 5 to 15 mm in diameter when the thickness of the pressure-sensitive adhesive layer is about 25 mm. Each clump preferably contains from 5 to about 100 particles. The pressure-sensitive adhesive layer can be covered with a carrier web which has a low adhesion surface that is formed with depressions that protect the clumps of particles.

Yet another useful adhesive is disclosed in U.S. Pat. No. 5,296,277 (Wilson et al.), where the adhesive layer has at least one topologically microstructured surface comprising a plurality of pegs, optionally containing one or more beads, substantially uniformly distributed and protruding outwardly from the adhesive layer, wherein the pegs have essentially flat tops that comprise less than 25% of the total surface contact area of the adhesive layer, and have a height of at least 15 mm. This adhesive composition is both positionable and repositionable.

A particularly suitable adhesive on a transfer tape is commercially available from Minnesota Mining and Manufacturing Company (3M) of St. Paul, Minn., USA under the brand 3M™ Double-Coated Repositionable Film Tape 9415PC. This transfer tape permits transfer of the repositionable adhesive to a flexible backing, printed or unprinted.

If a release liner is desired, release liners are also well known and commercially available from a number of sources. Nonlimiting examples of release liners include silicone coated Kraft paper, silicone coated polyethylene coated paper, silicone coated or non-coated polymeric materials such as polyethylene or polypropylene, as well as the aforementioned base materials coated with polymeric release agents such as silicone urea, urethanes, and long chain alkyl acrylates, such as defined in U.S. Pat. No. 3,957,724; 4,567,073; 4,313,988; 3,997,702; 4,614,667; 5,202,190; and 5,290,615; the disclosures of which are incorporated by reference herein and those liners commercially available as Polyslik brand liners from Rexam Release of Oakbrook, Ill., USA and EXHERE brand liners from P.H. Glatfelter Company of Spring Grove, Pa., USA.

One distinguishing characteristic of adhesive 26 from adhesive 16 is that adhesive 26 should be transparent to permit the measurement layer 24 to be seen in the configuration of tape 20 in its second surface placement. Nonlimiting examples of transparent adhesives with transparent backings are marketed by Minnesota Mining and Manufacturing Company of St. Paul, Minn. under the brand Scotchcal™ V6089 films.

Especially preferred among the adhesives disclosed-identified patents are those adhesives which are aggressive, removable, positionable or repositionable or both, and have low tack; all depending on the particular industry and the sensitive of the substrate at the time of adhesive placement and adhesive removable of tapes 10 and 20 from the substrate being measured. For example, in the fabric industry, the fabric may be considerably expensive and sensitive to placement of adhesives thereon, which militates towards a low tack adhesive. In contrast, a rough building material such as concrete block may require an aggressive adhesive without regard to the difficulty of removal because of the need for assurance of the adhesion during measurement. It is an advantage of the present invention that a variety of adhesives can be selected to be use with a variety of methods of printing of the measurement scale on a variety of backings, such that one those skilled in the art can tailor a particular type of tape 10 for use with particular industry.

Tapes 10 and 20 can be either placed in suitable lengths along a release liner or rolled for dispensing from a compact dispenser. As stated above, in respect of tape 10, the surface of measurement layer 14 needs to accommodate a low-adhesion backsize property to permit a suitable surface forte rolling of tape 10 as intended with layer 16 on the opposite side from layer 14. For tape 20, the opposing major surface of backing 22 must have such low-adhesion backsize properties fir unrolling from the adhesive layer 26 when tape 20 is stored in a rolled condition. Suitable low-adhesion backsize compositions are well known to those skilled in the art including those disclosed in U.S. Pat. No. 4,825,763 (Truskolaski et al.); U.S. Pat. No. 4,873,140 (McIntyre); and U.S. Pat. No. 4,587,156 (Wu); the disclosures of which are incorporated by reference herein.

Printing of a tape 10 or tape 20 can be conveniently arranged to have alternating background color at given intervals, such as at 12 inch lengths, preferably with a perforation at a second interval, such as at 36 inch lengths. With the surface of backing 12 suitable for various types of printing, one skilled in the art is able to customize any type of combination of scales and backgrounds according to the desires of the market.

Figure 3:
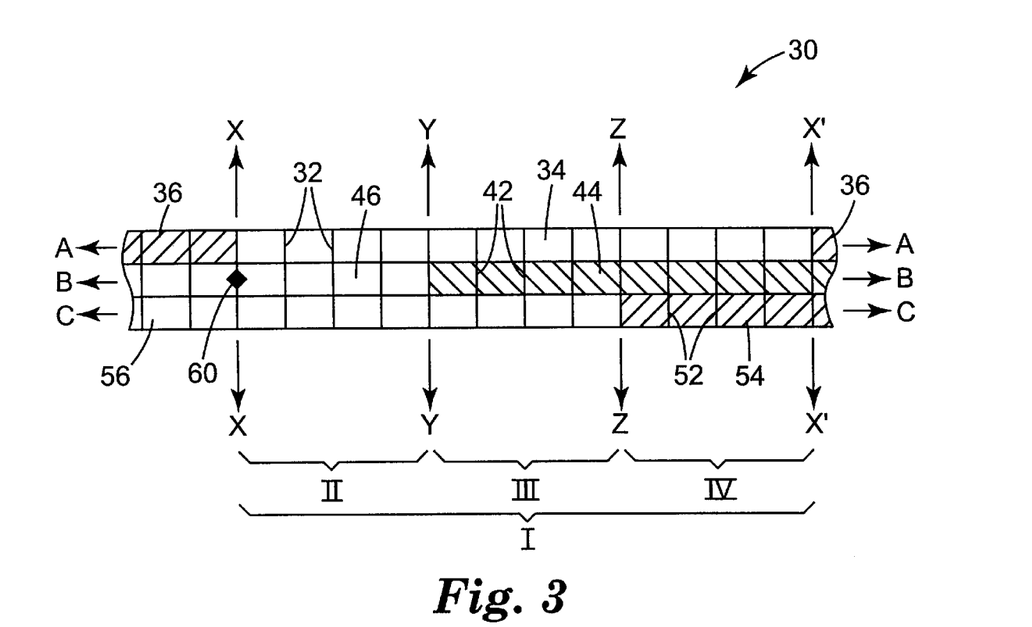
FIG. 3 is a measuring tape of a preferred embodiment of the present invention having multiple scales along linear axes of the measuring tape.

FIG. 3 discloses one preferred embodiment of the present invention having a multiple scale on layer 14 or layer 24 of tapes 10 or 20. Viewed from above, FIG. 3 shows a tape 30 having a multiple of linear axes A—A; B—B; and C—C and a multiple of transverse axes X—X; Y—Y; and Z—Z. Tape 30 is merely exemplary of one embodiment of the invention in that it shows three linear axes and three transverse axes, but the invention is not limited to a plurality of three. Indeed, tape 30 of the present invention can have any number of multiple scales from about 2 to about 20, and preferably from 3 to 5.

The number of linear axes equals the number of transverse axes because each linear axis represents a linear segment of tape 30 which is a function of the number of transverse axes on tape 30. As seen in FIG. 3, the linear segments represented by axes A—A; B—B; and C—C are equally spaced, although one skilled in the art can vary the width of the segments according to particular needs or particular industry. The distance between axes X—X and its repetition X'—X' is represented by I, the distance of which is determined according to the needs of the particular industry. After having established the initial interval I, then one skilled in the art can determine the appropriate interval II which represents the distance between transverse axis X—X and transverse axis Y—Y. Moreover, the interval between transverse axis Y—Y and transverse axis Z—Z is represented by III in FIG. 3. Finally, Interval IV represents the interval between transverse axis Z—Z and transverse axis X'—X'.

Interval I also represents the distance from transverse axis Y—Y to transverse axis Y'—Y' (not shown) and axis Z—Z- to axis Z'—Z' (also not shown). Thus, the configuration of intervals I, II, III, and IV are such that once the Interval I is determined, then Intervals II, III, and IV are integral fractions of Interval I and their sum equals the length of Interval I. Preferably, Intervals II, III and IV are the same integral fractional number, although they can be different according to the needs of the one skilled in the art. For example, the Interval I can be 12 inches with the Intervals II, III and IV each being four inches.

Alternatively, the distance of Interval I can be unique to the distance between transverse axis X—X and X'—X' with no relationship to the distance between transverse axis Y—Y and Y'–Y' and/or the distance between axis Z—Z and axis Z'—Z', so that one skilled in the art would recognize that the use of tape 30 can be utilized in the alternative different scales represented by linear segments A—A, B—B and C—C without regard to the relationship among linear segments A—A, B—B, and C—C. Each of the transverse axes becomes a repeating scale, which can be the same or different depending on the Intervals I chosen. In one embodiment, with Interval I at 12 inches and Intervals II, III, and IV at four inches, no use of tape 30 is more than four inches from the beginning of a foot-long scale. That configuration minimizes waste of tape 30 during usage because one can rotate among the closest zero point that begins an Interval I to begin adhered measurement of a surface. Alternatively, one can use one segment scale for one type of measurement on a surface and a second segment scale for a second type of measurement on that same surface. Use of different colors for lines 32, 42, and 52 within each segment A—A; B—B; and C—C assists such discernable usage. In other words, the measurement layer can have multiple scales of different systems of measurement.

For example, linear segment A—A beginning at transverse axis X—X can be a 12 inch linear scale with linear segment B—B being a logarithmic scale beginning at transverse axis Y—Y with linear segment C—C being a metric scale beginning at transverse axis Z—Z. While such a combination is possible, one skilled in the art may find such combination of single tape 30 unduly complicated, but the possibility that industries may have such needs and the ability of measuring tapes of the present invention to be configured in such manner is an unexpected advantage of tapes of the present invention.

On the assumption that tape 30 represented in FIG. 3 is comprised of three linear segments A—A; B—B; and C—C, where each linear segment is a represents 12 inch scale from each respective transverse axis, then an appreciation of how the scales may be so configured can occur. Transverse axis X—X can be the zero line for linear segment A—A as distinguished by periodic markings 32 such as inch segments or fractions of inch segments between axis X—X and axis X'—X', which begins a repeating scale. The indications of such periodic lines 32 can be a contrasting color on a white surface, a contrasting color on a black surface, or some combination of white and black according to visually perceptible needs of the person skilled in the art. For example, background color 34 can be white for the segment A—A between axes X—X and X'—X' with a second background color 36 indicating the Interval I between transverse and X'—X' and X"—X" (not shown but see the Interval I ending at axis X—X). In that manner, the Interval I can be easily identified within segment A—A by the background color of each Interval I preferably alternating between two distinguishing background colors 34 and 36 upon which periodic lines 32 are superimposed.

Continuing with segment B—B, such scale begins at axis Y—Y and terminates at axis Y'—Y'. Periodic lines 42 can be the same or different in scale from that of periodic lines 32 in segment A—A. Interval I is indicated by a background color 44 as distinguished from a background color 46. More than two background colors can be used according to the needs of one skilled in the art to farther distinguish segment B—B from segment A—A of the scales on tape 30. The distance between the zero point of the scale of segment A—A and the scale of segment B—B is Interval II as seen in FIG. 3.

Referring now to segment C—C of tape 30, the zero point can be at axis Z—Z having periodic lines 52 superimposed on a background color 54 within the first interval I and a background color 56 in an alternating or sequential fashion for further Intervals I.

FIG. 3 demonstrates that within such described mathematical principles of the present invention, one can combine multiple scales onto a single measuring tape where use of periodic lines 32, 42 and 52 as distinguished by background colors 34 and 36; 44 and 46; and 54 and 56 can provide a multitude of customize multiple scale measurements for customized use in a particular industry. For example, it may be significant to provide certain dimensions for such industries as building construction, painting and wall papering, copy and crafts, fabric and clothing, furniture and appliance, signage and automobile detailing, and other industries. With the ability to use personal computers and consumer or office printing equipment, desktop publishing of measuring tapes is easily performed. Moreover, because the tape 10, 20, or 30 can be conformed to single or compound curved surfaces hands-free measuring of such curved surfaces is possible.

Optionally, one can add unique symbols notable to a given industry at specific locations on any or all of sections A—A; B—B; and C—C. For example, one can add 16 inch stud location markings or one can add promotional or other branding indicia on tape (generally represented by item 60) during the course of the printing process of making tape 30. Preferably, one skilled in the art will learn what customized indicia are desired and add such markings into the printing process as needed.

While a number of embodiments have been disclosed, the invention is not so limited. The claims follow.

What is claimed is:

1. An adhesive backed measuring tape, comprising (a) a flexible backing having two major surfaces, wherein one major surface has a measurement layer printed or contacted thereon, thereby providing a measuring tape; and (b) a repositionable adhesive layer adhered to the other major surface of the flexible backing or to the surface having the measurement layer printed or contacted thereon, the adhesive layer being capable of being easily slid over a substrate without preadhering to the substrate, wherein said adhesive tape is wound directly upon itself in a roll form and has perforations at given intervals of length according to the measurement layer.

2. The tape of claim 1, wherein the adhesive layer is adhered to the other major surface of the flexible backing.

3. The tape of claim 1, wherein the adhesive layer is a transparent adhesive adhered to the surface having the measurement layer printed or contacted thereon, said transparent adhesive being on top of the measurement layer.

4. The tape of claim 2, further comprising a low-adhesion backsize property on the surface having the measurement layer printed or contacted thereon.

5. The tape of claim 3, further comprising a low-adhesion backsize property on the other major surface of the backing.

6. The tape of claim 1, wherein the measurement layer has alternating background colors at given intervals.

7. The tape of claim 1, wherein the measurement layer has a multiple of linear axes and a multiple of transverse axes, wherein each linear axis represents a linear segment of the measuring tape which is a function of the number of transverse axes.

8. The tape of claim 1, wherein the backing is selected from the group consisting of transparent materials, translucent materials, and opaque materials;

wherein the backing is selected from the group consisting of singularly colored materials, multiply colored materials, white materials, and black materials;

wherein the backing is selected from the group consisting of glossy materials, matter materials, metallic materials, reflective materials, retroreflective materials, and luminescent materials; and optionally having a surface receptive to pen and pencil markings.

9. The tape of claim 1, wherein the adhesive layer is composed of an acrylic pressure sensitive adhesive material.

10. The tape of claim 1, further comprising a symbol printed on the measurement layer, wherein the symbol is selected from the group consisting of a stud location marking, a promotional symbol, a branding indicium, and combinations thereof.

* * * * *

UNITED STATES PATENT AND TRADEMARK OFFICE
CERTIFICATE OF CORRECTION

PATENT NO. : 6,637,124 B2  Page 1 of 3
DATED : October 28, 2003
INVENTOR(S) : Jeffrey C. Pederson It is certified that error appears in the above-identified patent and that said Letters Patent is hereby corrected as shown below:

Drawing,
After drawing sheet 1, insert -- FIG. 4 --

Fig. 4

UNITED STATES PATENT AND TRADEMARK OFFICE
CERTIFICATE OF CORRECTION

PATENT NO. : 6,637,124 B2
DATED : October 28, 2003
INVENTOR(S) : Jeffrey C. Pederson It is certified that error appears in the above-identified patent and that said Letters Patent is hereby corrected as shown below:

Column 1,
Line 27, delete "contract", insert -- contact --
Line 36, delete "which" after "tapes"
Line 39, delete "includes" after "which"
Line 64, delete "the" after "in"

Column 2,
Line 52, insert -- of --, after "number"
Line 64, delete "a" after "of"

Column 3,
Line 65, delete second occurrence of "as"

Column 4,
Line 2, delete "as" after "comprise"
Lines 5 and 8, delete "masking", insert -- measuring --
Line 26, delete "banking", insert -- backing --
Line 31, after "itself", insert -- a period --
Line 33, delete "roiled", insert -- rolled --

Column 5,
Line 16, after "to", insert -- about --
Line 52, delete "Nos." insert -- No. --

Column 7,
Line 52, delete "sensitive", insert -- sensitively --
Line 53, delete "removable", insert -- removal --
Line 62, delete "use", insert -- used --
Line 64, delete "one" after "that"

Column 8,
Line 3, delete "forte", insert -- for the --
Line 7, delete "fir", insert -- for --
Line 60, delete "the", after "of"

UNITED STATES PATENT AND TRADEMARK OFFICE
CERTIFICATE OF CORRECTION

PATENT NO. : 6,637,124 B2
DATED : October 28, 2003
INVENTOR(S) : Jeffrey C. Pederson It is certified that error appears in the above-identified patent and that said Letters Patent is hereby corrected as shown below:

Column 9,
Line 16, delete "discernable", insert -- discernible --
Line 32, delete "is a represents", insert -- represents a --
Line 45, delete "and", insert -- axes --
Line 58, delete "farther", insert -- further --

Column 10,
Line 6, delete "customize", insert -- customized --

Column 11,
Line 5, delete "matter", insert -- matte --

Signed and Sealed this

Twenty-second Day of February, 2005

JON W. DUDAS
*Director of the United States Patent and Trademark Office*